(12) United States Patent
Odate et al.

(10) Patent No.: US 10,322,742 B2
(45) Date of Patent: Jun. 18, 2019

(54) STEERING DEVICE

(71) Applicant: HONDA MOTOR CO., LTD., Tokyo (JP)

(72) Inventors: Shotaro Odate, Wako (JP); Takeshi Fujimaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 15/472,470

(22) Filed: Mar. 29, 2017

(65) Prior Publication Data

US 2017/0282956 A1 Oct. 5, 2017

(30) Foreign Application Priority Data

Mar. 31, 2016 (JP) ................................. 2016-070374

(51) Int. Cl.

| B62D 1/06 | (2006.01) |
| B60K 28/06 | (2006.01) |
| B62D 1/04 | (2006.01) |
| H05B 3/06 | (2006.01) |
| H05B 3/14 | (2006.01) |
| H05B 3/34 | (2006.01) |

(52) U.S. Cl.
CPC .............. B62D 1/065 (2013.01); B60K 28/06 (2013.01); B62D 1/046 (2013.01); H05B 3/06 (2013.01); H05B 3/146 (2013.01); H05B 3/34 (2013.01); *H05B 2203/013* (2013.01)

(58) Field of Classification Search
CPC ........ B62D 1/065; B62D 1/046; B60K 28/06; B60K 28/02; B60R 16/027; H05B 3/08
See application file for complete search history.

(56) References Cited

U.S. PATENT DOCUMENTS

| 4,421,960 A * | 12/1983 | Arima ..................... B60K 37/00 |
| | | 200/61.54 |
| 2008/0210048 A1* | 9/2008 | Yoneyama ............. B62D 1/065 |
| | | 74/552 |

(Continued)

FOREIGN PATENT DOCUMENTS

| JP | 2003-535757 A | 12/2003 |
| JP | 2008-59459 A | 3/2008 |

(Continued)

OTHER PUBLICATIONS

Office Action dated Dec. 12, 2017, issued in counterpart Japanese Application No. 2016-070374, with English translation (12 pages).

*Primary Examiner* — Vicky A Johnson

(74) *Attorney, Agent, or Firm* — Westerman, Hattori, Daniels & Adrian, LLP

(57) ABSTRACT

A steering device 10 mounted on a vehicle includes: a steering body 12 having left and right sensors 22L and 22R installed in a rim 16 gripped by a driver to detect a driver's condition; and a detection circuit 14 configured to detect a driver's condition on the basis of a detection signal from at least the left and right sensors 22L and 22R, wherein a wire length Ll of a left harness 30L from the detection circuit 14 to the left sensor 22L is substantially equal to a wire length Lr of a right harness 30R from the detection circuit 14 to the right sensor 22R.

4 Claims, 3 Drawing Sheets

(56) References Cited

U.S. PATENT DOCUMENTS

2010/0137702 A1* 6/2010 Park .................... A61B 5/0402
                                                          600/393
2015/0329136 A1* 11/2015 Lofy .................... B62D 1/065
                                                           62/3.3
2016/0129860 A1* 5/2016 Moinard ................ B62D 1/04
                                                          74/552

FOREIGN PATENT DOCUMENTS

| JP | 2015-147531 A | 8/2015 |
| WO | 2014/123222 A1 | 8/2014 |
| WO | 2016/013180 A1 | 1/2016 |

* cited by examiner

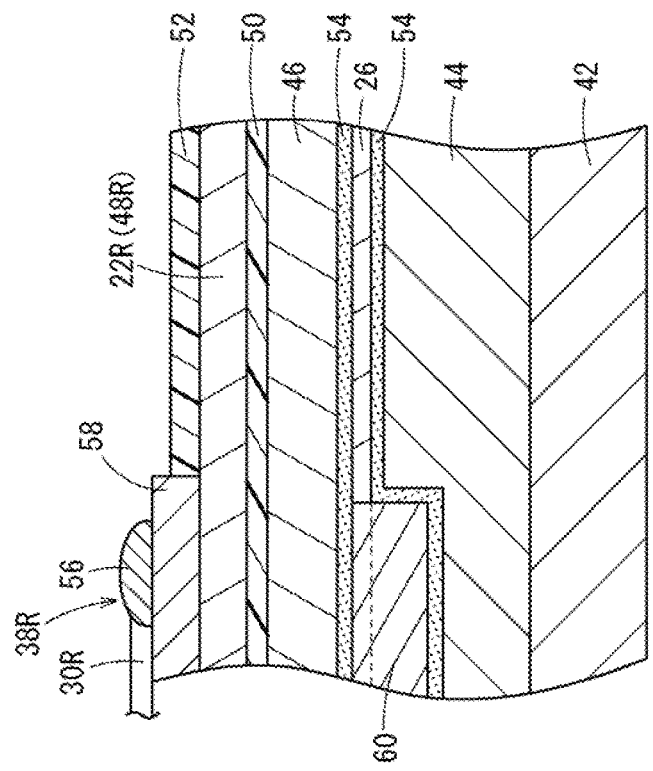
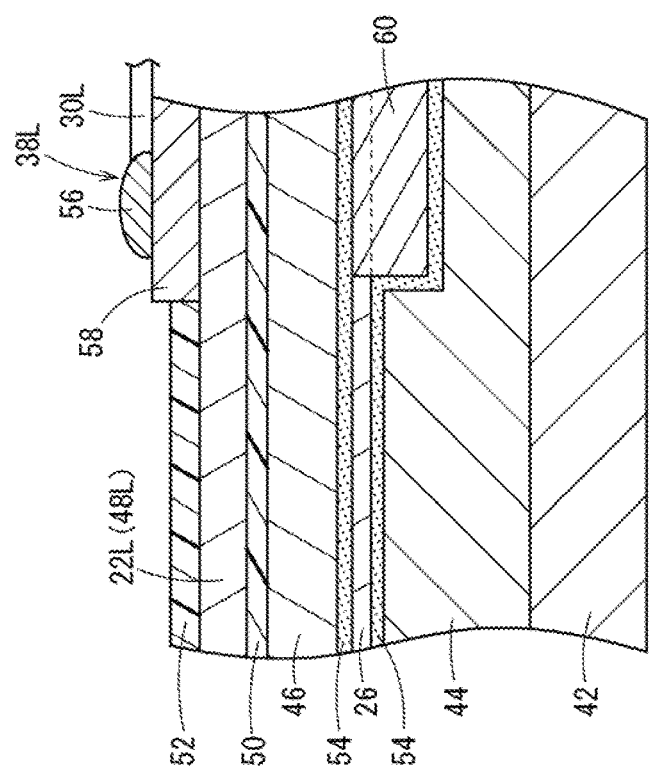

STEERING DEVICE

CROSS-REFERENCE OF RELATED APPLICATION

This application claims priority of Japanese Patent Application No. 2016-070374 filed in Japan on Mar. 31, 2016, the entire contents of which are incorporated herein by reference.

TECHNICAL FIELD

The present invention relates to a steering device installed in a vehicle and gripped by a driver during a vehicle travel.

BACKGROUND OF THE INVENTION

In the prior art, a steering device having a means for detecting whether or not a driver grips a steering wheel is discussed in Japanese Laid-open Patent Publication No. 2008-059459, PCT international application No. 2003-535757, and Japanese Laid-open Patent Publication No. 2015-147531.

In Japanese Laid-open Patent Publication No. 2008-059459, a steering device is discussed, in which a grip detection means for detecting whether or not an operator grips a steering wheel is arranged along a circumference of the steering wheel, and an alarming means is selectively operated depending on a result of the detection from the grip detection means.

In PCT international application No. 2003-535757, a vehicle steering wheel provided with a plurality of sensors is discussed, in which each of the sensors is divided into a plurality of segments to detect a position of a driver's hand on the steering wheel.

In Japanese Laid-open Patent Publication No. 2015-147531, a steering device having a structure simplified by reducing the number of wires is discussed. This steering device has an electrostatic capacitive sensor installed in a steering core. This electrostatic capacitive sensor has a flexible plate having flexibility and a plurality of electrostatic capacitance detection sensors provided on the flexible plate. While each electrostatic capacitance detection sensor is installed in the steering core, they are arranged at predetermined intervals along a circumferential direction of the steering core by using a wheel extending direction as an axial core and are formed to extend along the wheel extending direction, respectively. While a plurality of electrostatic capacitance detection sensors are installed in the steering core, they are grouped such that electrodes neighboring in the circumferential direction of the steering core belong to different groups.

SUMMARY OF INVENTION

In the steering wheels discussed in Patent Documents 1 and 2, the detection accuracy of the grip portion may be improved by increasing the number of sensors. However, the number of wires increases accordingly. This disadvantageously increases the size of the steering wheel and the working time for wiring. This may also increase cost.

Using the steering device discussed in Patent Document 3, the structure can be simplified by reducing the number of wires because electrostatic capacitive sensors are installed in the steering core. However, in the steering device having the electrostatic capacitive sensor installed in the steering core as discussed in Patent Document 3, it is necessary to measure a minute change of the electrostatic capacitance in order to detect a steering device gripping state of the driver, that is, driver's steering wheel gripping.

In this case, since it is conceived that noise resistance is weak, it may be difficult to accurately detect driver's steering wheel gripping.

In view of the aforementioned problems, the present invention provides a steering device capable of reliably and accurately detecting a minute change of the electrostatic capacitance, for example, when a driver grips the steering wheel without necessity of employing a complicated circuit configuration or structure.

[1] According to the present invention, there is provided a steering device mounted on a vehicle, including: a steering body having left and right sensors installed in a rim gripped by a driver to detect a driver's condition; and a detection circuit configured to detect a driver's condition on the basis of a detection signal from at least the left and right sensors, wherein a wire length of a left harness from the detection circuit to the left sensor is substantially equal to a wire length of a right harness from the detection circuit to the right sensor. The term "substantially equal" means that a difference of the wire length is equal to or smaller than 5 mm.

Since the wire length of the left harness is set to be nearly equal to the wire length of the right harness, it is possible to set the impedance from the detection circuit to the left sensor and the impedance from the detection circuit to the right sensor to be constant. As a result, it is possible to reliably and accurately detect a minute change of the electrostatic capacitance, for example, when a driver grips the steering wheel. In addition, since there is no need to employ a complicated circuit configuration or structure, it is possible to reduce a manufacturing cost and facilitate maintenance.

[2] In the present invention, the left and right harnesses preferably have the same electric property. Since the harnesses have the same electrical property, it is possible to allow the left and right harnesses to have the same impedance just by setting the wire lengths of the left and right harnesses to be equal to each other. Therefore, it is possible to detect left and right hand's contact with high accuracy without increasing cost.

[3] In the present invention, the steering body preferably has a central spoke, a left spoke, and a right spoke, the left and right spokes are preferably arranged axially symmetrically with respect to the central spoke, the detection circuit is preferably installed in the central spoke, a connecting portion between the left harness and the left sensor is preferably set in the vicinity of a connecting portion between the left spoke and the rim, and a connecting portion between the right harness and the right sensor is preferably set in the vicinity of a connecting portion between the right spoke and the rim.

If the left and right spokes are arranged axially symmetrically with respect to the central spoke as in a T-shaped or Y-shaped spoke, it is possible to easily set the wire lengths of the left and right harnesses to be substantially equal to each other with the highest wiring efficiency by installing the detecting circuit in the central spoke, setting the connecting portion between the left harness and the left sensor in the vicinity of the connecting portion between the left spoke and the rim, and setting the connecting portion between the right harness and the right sensor in the vicinity of the connecting portion between the right spoke and the rim.

[4] In the present invention, the steering body preferably has a core metal installed in a center portion, and an electroconductive film for left sensor and an electroconductive film for right sensor stacked on the core metal by interposing a substrate and a leather member, the left harness extending from the detection circuit is preferably soldered to the left sensor in a direct or indirect manner, the right harness extending from the detection circuit is preferably soldered to the right sensor in a direct or indirect manner, and a hard member harder than polyester is preferably interposed between the soldered portion and the substrate.

If the left harness is soldered to the left sensor in a direct or indirect manner, the leather member may be shrunk by heat. This similarly happens when the right harness is soldered to the right sensor in a direct or indirect manner. Such a thermal shrinkage of the leather member may generate influence such as deformation in the soldered portion. As a result, for example, aesthetic appearance may be impaired, or the solder may be stripped off. In this regard, the hard member harder than polyester is interposed between the soldered portion and the substrate in advance. Since the hard member is interposed between the substrate and the leather member that covers the substrate, a portion of the leather member adjoining the hard member is pulled in a surface direction. As a result, even when the left harness is soldered to the left sensor in a direct or indirect manner, it is possible to suppress a thermal shrinkage in the leather member. Therefore, it is possible to prevent impairment of aesthetic appearance or stripping of the solder. This similarly applies when the right harness is soldered to the right sensor in a direct or indirect manner.

If the substrate is formed of a material susceptible to heat such as urethane, the substrate may be shrunk by the soldering heat. However, since the hard member harder than polyester is interposed between the soldered portion and the substrate in advance, it is possible to obtain the following effects. Specifically, even when the substrate is thermally shrunk, deformation generated by the thermal shrinkage is suppressed by the hard member and does not affect the soldered portion. In addition, if a glass plate, a glass-epoxy plate, a bakelite plate, a ceramic plate, or the like is employed as the hard member, the soldering heat is not easily transferred to the substrate, and it is possible to suppress the thermal shrinkage of the substrate caused by the soldering work because such a plate has high thermal resistance.

[5] In the present invention, the steering device preferably further includes a heater portion for heating the steering body, wherein the heater portion preferably has an electroconductive film serving as a heater, and the electroconductive film is preferably interposed between the right and left sensors and the substrate.

Typically, the electrostatic capacitance of the substrate is detected by the detection circuit as an offset capacitance. If this offset capacitance is large, it may be difficult for the detection circuit to detect a minute change of the capacitance in the left and right sensors. In this regard, since the electroconductive film is interposed between the right and left sensors and the substrate, it is possible to shield the electrostatic capacitance of the substrate from the right and left sensors. Therefore, it is possible to allow the detection circuit to easily detect a minute change of the capacitance in the left and right sensors.

Effect of the Invention

Using the steering device according to the present invention, it is possible to reliably and accurately detect a minute change of the electrostatic capacitance, for example, when a driver grips the steering wheel without necessity of employing a complicated circuit configuration or structure.

BRIEF DESCRIPTION OF THE DRAWINGS

FIG. 3A is a cross-sectional view illustrating an electrical connecting portion between a left harness and a left sensor.

FIG. 3B is a cross-sectional view illustrating an electrical connecting portion between a right harness and a right sensor.

DETAILED DESCRIPTION OF THE INVENTION

An exemplary configuration of a steering device according to an embodiment of the present invention will now be described with reference to FIGS. 1 to 3B.

Figure 1:
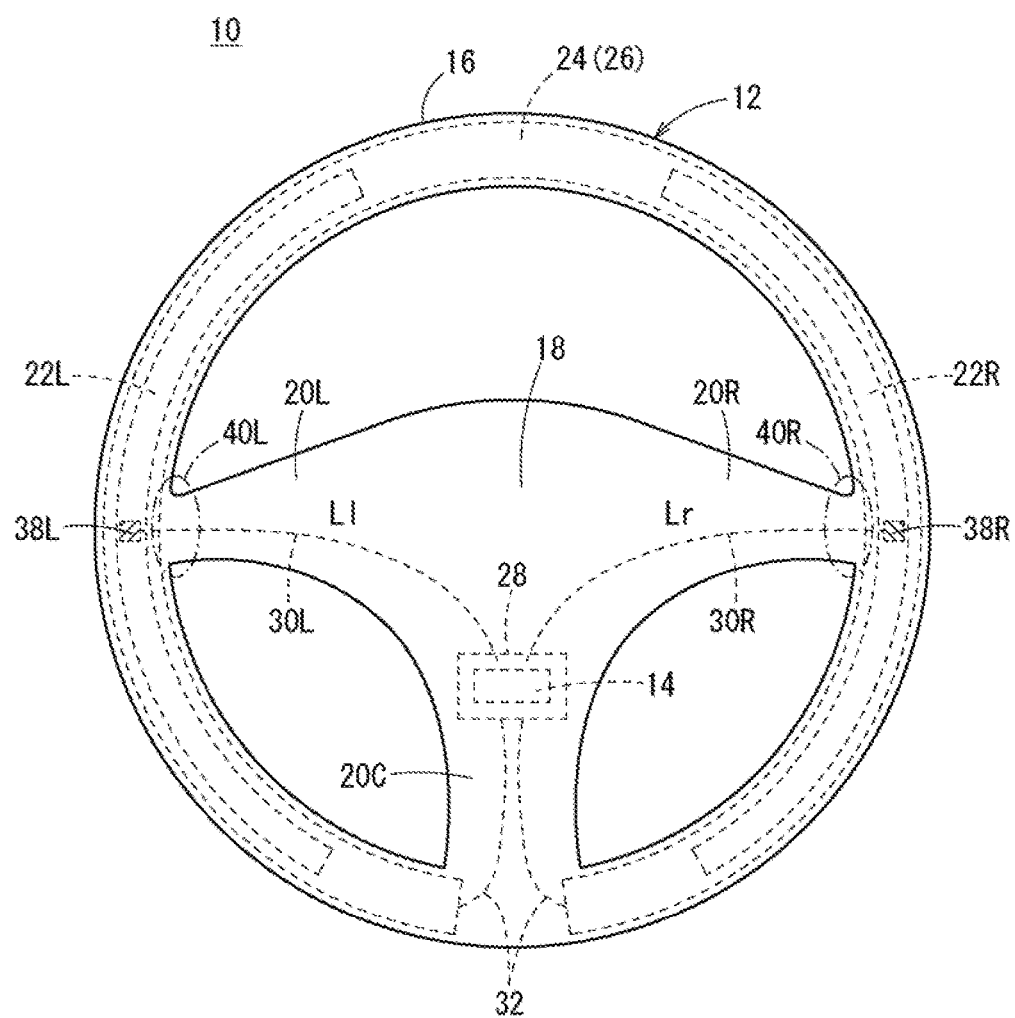
FIG. 1 is a front view illustrating a steering device according to an embodiment of the present invention.

A steering device 10 according to an embodiment of the present invention is mounted on a vehicle and has a steering body 12 and a detection circuit 14 as illustrated in FIG. 1.

The steering body 12 has a rim 16 gripped by a driver (operator), a hub 18 installed in the center of the rim 16, and central, left, and right spokes 20C, 20L, and 20R installed between the hub 18 and the rim 16. Each of the spokes 20C, 20L, and 20R is arranged such that the left and right spokes 20L and 20R are axially symmetrical with respect to the central spoke 20C. FIG. 1 illustrates a T-shaped spoke in which the central, left, and right spokes 20C, 20L, and 20R are arranged in a T-shape. Naturally, they may be arranged in a Y-shape.

The rim 16 is internally provided with left and right sensors 22L and 22R for detecting a driver's condition. Both the left and right sensors 22L and 22R include electrostatic capacitive sensors. In addition, the rim 16 is also internally provided with a heater portion 24 for heating the rim 16. The heater portion 24 has an electroconductive film 26 (refer to FIGS. 3A and 3B) as an electric heating wire of the heater.

The detection circuit 14 is integrated into, for example, an electronic control unit (hereinafter, simply referred to as "ECU" 28) that controls the steering device 10. The detection circuit 14 and the left sensor 22L are electrically connected to each other with the left harness 30L, and the detection circuit 14 and the right sensor 22R are electrically connected to each other with the right harness 30R. In addition, the heater portion 24 is electrically connected to the ECU 28 with a heater wire 32 and is supplied with electric power through the ECU 28. The left and right harnesses 30L and 30R are formed of materials having the same electrical property.

Figure 2:
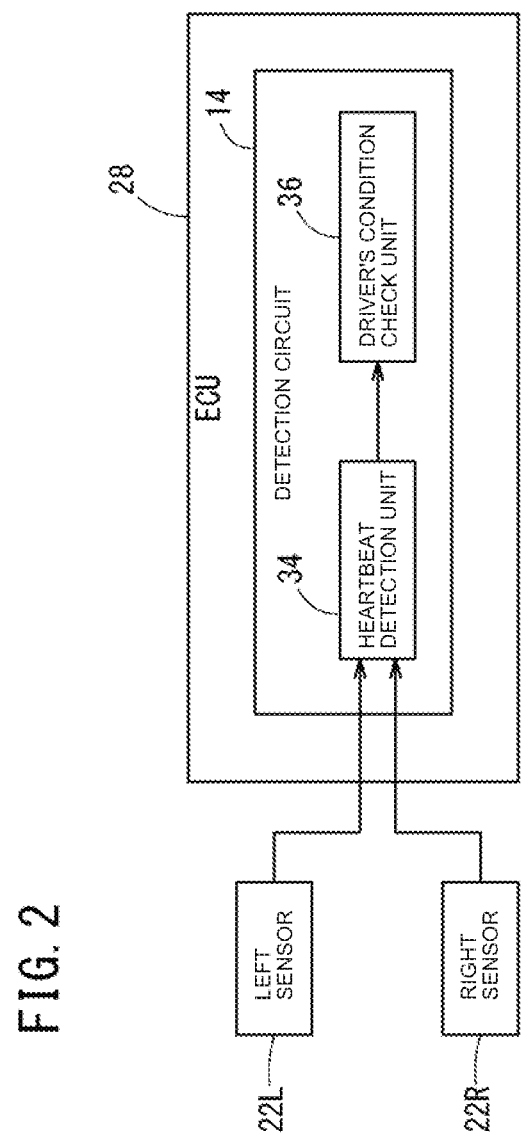
FIG. 2 is a block diagram illustrating an exemplary configuration of a detection circuit.

The detection circuit 14 at least has a heartbeat detector 34 and a driver's condition check unit 36 as illustrated in FIG. 2.

The heartbeat detector 34 outputs a waveform (time sequence signal) expressing a driver's heartbeat to the driver's condition check unit 36 on the basis of a voltage difference between a voltage detected by the left sensor 22L and a voltage detected by the right sensor 22R.

The driver's condition check unit 36 determines whether or not a driver grips the rim 16 of the steering body 12 with his/her both hands during a vehicle travel on the basis of the output from the heartbeat detector 34. When no heartbeat is measured, the driver's condition check unit 36 determines that the driver does not grip the rim 16 with his/her both hands during a vehicle travel because it is estimated that the driver releases his/her one hand. In addition, the driver's condition check unit 36 determines whether or not the amount of moisture on the driver's hand skin used to grip the rim 16 is small on the basis of the output from the heartbeat detector 34.

In the steering device 10 according to an embodiment of the present invention, a wire length Ll of the left harness 30L from the detection circuit 14 to the left sensor 22L is substantially equal to a wire length Lr of the right harness 30R from the detection circuit 14 to the right sensor 22R. Here, the term "substantially" means a difference between the wire length Ll of the left harness 30L and the wire length Lr of the right harness 30R is equal to or smaller than 5 mm.

Since the wire length Ll of the left harness 30L is substantially equal to the wire length Lr of the right harness 30R, it is possible to make impedance from the detection circuit 14 to the left sensor 22L and impedance from detection circuit 14 to the right sensor 22R constant. As a result, it is possible to reliably and accurately detect a minute change of the electrostatic capacitance, for example, when a driver grips the steering wheel. In addition, since there is no need to employ a complicate circuit configuration or structure, it is possible to reduce a manufacturing cost and facilitate maintenance. Furthermore, since the left and right harnesses 30L and 30R are formed of materials having the same electrical property, impedance of the left harness 30L becomes equal to impedance of the right harness 30R just by setting the wire lengths Ll and Lr of the left and right harnesses 30L and 30R to be equal to each other. Therefore, it is possible to detect contact of left and right hands with high accuracy without increasing cost.

In particular, according to an embodiment of the present invention, the ECU 28 is installed inside the central spoke 20C. As a result, it is possible to wire the left harness 30L from the center of the central spoke 20C to the left sensor 22L through the obliquely upper left spoke 20L and wire the right harness 30R from the center of the central spoke 20C to the right sensor 22R through the obliquely upper right spoke 20R. In addition, it is possible to wire the heater wire 32 downward from the center of the central spoke 20C to the heater portion 24 (electroconductive film 26). That is, it is possible to separately wire the heater wire 32 that requires electric power and the left and right harnesses 30L and 30R through which a minute signal (such as a minute electric current) flows. Therefore, it is possible to avoid influence of electronic noise from the heater wire 32.

An electrical connecting portion 38L between the left harness 30L and the left sensor 22L is set in the vicinity of a connecting portion 40L between the left spoke 20L and the rim 16, and an electrical connecting portion 38R between the right harness 30R and the right sensor 22R is set in the vicinity of a connecting portion 40R between the right spoke 20R and the rim 16. For this reason, it is possible to easily set the wire lengths Ll and Lr of the left and right harnesses 30L and 30R to be substantially equal to each other with the highest wiring efficiency.

Here, a cross-sectional structure of the steering body 12 will be described with reference to FIGS. 3A and 3B. FIG. 3A illustrates a cross section of the electrical connecting portion 38L between the left harness 30L and the left sensor 22L, and FIG. 3B illustrates a cross section of the electrical connecting portion 38R between the right harness 30R and the right sensor 22R.

As illustrated in FIGS. 3A and 3B, the steering body 12 has a core metal 42 provided in the center and electroconductive films 48L and 48R for left and right sensors (refer to FIGS. 3A and 3B), respectively, stacked on the core metal 42 by interposing a substrate 44 and a leather member 46. The substrate 44 is preferably formed of urethane or the like. The substrate 44 covers the core metal 42, and the leather member 46 covers the substrate 44.

For example, the electroconductive films 48L and 48R for left and right sensors, respectively, are formed as follows. Specifically, a base coat layer 50 is coated on the leather member 46 and is dried. Then, a conductive coat material (serving as the electroconductive films 48L and 48R for left and right sensors, respectively) is coated, for example, through spraying and is dried. Then, an overcoat layer 52 is coated on the conductive coat material and is dried. As a result, the electroconductive films 48L and 48R for the left and right sensors, respectively, are formed. That is, the left and right sensors 22L and 22R are formed on the leather member 46.

The electroconductive film 26 serving as a heater is interposed between the left and right sensors 22L and 22R and the substrate 44. In the example of FIGS. 3A and 3B, the electroconductive film is attached using an adhesive 54 between the substrate 44 and the leather member 46.

The left harness 30L extending from the detection circuit 14 is electrically connected (soldered) to the left sensor 22L (electroconductive film 48L for left sensor) in a direct or indirect manner using a solder layer 56. Similarly, the right harness 30R extending from the detection circuit 14 is electrically connected (soldered) to the right sensor 22R (electroconductive film 48R for right sensor) in a direct or indirect manner using the solder layer 56. In FIGS. 3A and 3B, the left harness 30L is soldered to the electroconductive film 48L for left sensor in an indirect manner using a conductive tape 58 directly attached to the electroconductive film 48L for left sensor, and the right harness 30R is soldered to the electroconductive film 48R for right sensor in an indirect manner using the conductive tape 58 directly attached to the electroconductive film 48R for right sensor.

According to an embodiment of the present invention, a hard member 60 harder than polyester is attached and interposed between the soldered portion (electrical connecting portions 38L and 38R) and the substrate 44 using the adhesive 54. Any member may be employed as the hard member 60 as long as it is harder than polyester. Preferably, a light-weight and electrically insulating material is employed as the hard member because it is placed in the vicinity of the electroconductive film 26 serving as a heater and is provided inside the rim 16 that rotates by a steering operation of a driver. For example, a glass plate, a glass-epoxy plate, a bakelite plate, a ceramic plate, or the like may be employed.

If the left harness 30L is soldered to the left sensor 22L in a direct or indirect manner, the leather member 46 may be thermally shrunk. This similarly happens when the right harness 30R is soldered to the right sensor 22R in a direct or indirect manner. The thermal shrinkage of the leather member 46 affects deformation in the soldered portion so that, for example, aesthetic appearance may be impaired, or the solder may be stripped off. In this regard, the hard member 60 harder than polyester is interposed between the soldered portion and the substrate 44 in advance.

Since the hard member 60 is interposed between the substrate 44 and the leather member 46 that covers the substrate 44, a portion of the leather member 46 adjoining the hard member 60 is pulled in a surface direction. As a result, even when the left harness 30L is soldered to the left sensor 22L in a direct or indirect manner, the thermal shrinkage of the leather member 46 is suppressed, so that there is no need to worry about impairment of aesthetic appearance or stripping of the solder. This similarly applies to when the right harness 30R is soldered to the right sensor 22R in a direct or indirect manner.

If the substrate 44 is formed of a material susceptible to heat such as urethane, the substrate 44 may be shrunk by the soldering heat. However, since the hard member 60 harder than polyester is interposed between the soldered portion and the substrate 44 in advance as described above, the following effects can be obtained. Specifically, even when the substrate 44 is thermally shrunk, deformation caused by the thermal shrinkage is suppressed by the hard member 60, so that the soldered portion is not affected. In addition, if a glass plate, a glass-epoxy plate, a bakelite plate, a ceramic plate, or the like is employed as the hard member 60, the heat generated in the event of soldering is not easily transferred to the substrate 44 because such a plate has high thermal resistance. Therefore, it is possible to suppress a thermal shrinkage of the substrate 44 caused by the soldering work. This alleviates the effect to the soldered portion caused by the thermal shrinkage of the substrate 44.

According to an embodiment of the present invention, the electroconductive film 26 serving as a heater is interposed between the left and right sensors 22L and 22R and the substrate 44 as described above. Typically, the electrostatic capacitance of the substrate 44 is detected by the detection circuit 14 as an offset capacitance. If this offset capacitance is large, it may be difficult for the detection circuit 14 to detect a minute change of the capacitance in the left and right sensors 22L and 22R. In this regard, by interposing the electroconductive film 26 between the left and right sensors 22L and 22R and the substrate 44, it is possible to shield the electrostatic capacitance of the substrate 44 from the left and right sensors 22L and 22R. Therefore, it is possible to allow the detection circuit to easily detect a minute change of the capacitance in the left and right sensors 22L and 22R. This improves detection accuracy of the detection circuit 14.

The present invention is not limited to the embodiments described above, and various alterations or modifications may be possible without departing from the spirit and scope of the present invention.

DESCRIPTION OF REFERENCE NUMERALS 10 steering device
12 steering body
14 detection circuit
16 rim
18 hub
20C central spoke
20L left spoke
20R right spoke
22L left sensor
22R right sensor
24 heater portion
26 electroconductive film
30L left harness
30R right harness
32 heater wire
38L, 38R electrical connecting portion
40L, 40R connecting portion
42 core metal
44 substrate
46 leather member
48L electroconductive film for left sensor
48R electroconductive film for right sensor
56 solder layer
58 conductive tape
60 hard member
Ll, Lr wire length

The invention claimed is:

1. A steering device mounted on a vehicle, comprising:
    a steering body having a rim to be gripped by a driver, left and right sensors installed in left and right portions of the rim, respectively, each of the left and right sensors being configured to detect a signal relating to a driver's condition;
    a left harness and a right harness connected to the left and right sensors, respectively, to transmit the respective signals therefrom; and
    a detection circuit connected to the left and right harnesses and configured to detect the driver's condition on a basis of the detected signals from at least said left and right sensors,
    wherein a wire length of the left harness from said detection circuit to said left sensor is substantially equal to a wire length of the right harness from said detection circuit to said right sensor, and
    wherein the steering body has
        a core metal installed in a center portion of the steering body, on which a substrate and a leather member are provided, and
        an electroconductive film for left sensor and an electroconductive film for right sensor each stacked on said core metal by interposing the substrate and the leather member between each electroconductive film and the said core metal,
    said left harness extending from said detection circuit is soldered to said left sensor in a direct or indirect manner,
    said right harness extending from said detection circuit is soldered to said right sensor in a direct or indirect manner, and
    a hard member harder than said substrate is provided between said soldered portion and said substrate.

2. The steering device according to claim 1, wherein said left and right harnesses have the same electric property as each other.

3. The steering device according to claim 1, wherein said steering body has a central spoke, a left spoke, and a right spoke,
    said left and right spokes are arranged axially symmetrically with respect to said central spoke,
    said detection circuit is installed in said central spoke, said left harness and said left sensor are connected to each other in a vicinity of a connecting portion between said left spoke and said rim, and
    said right harness and said right sensor are connected to each other in a vicinity of a connecting portion between said right spoke and said rim.

4. The steering device according to claim 1, further comprising a heater portion configured to heat said steering body,
    wherein said heater portion comprises an electroconductive film which is a heater, and said electroconductive film is provided between said right and left sensors and said substrate.

* * * * *